(12) United States Patent
Collin

(10) Patent No.: US 8,641,408 B2
(45) Date of Patent: Feb. 4, 2014

(54) DEVICE FOR STRETCHING FILM SECTIONS IN A MONOAXIAL OR BIAXIAL MANNER

(75) Inventor: Heinrich Collin, Vaterstetten (DE)

(73) Assignee: Dr. Collin GmbH, Ebersberg (DE)

( * ) Notice: Subject to any disclaimer, the term of this patent is extended or adjusted under 35 U.S.C. 154(b) by 244 days.

(21) Appl. No.: 13/263,174

(22) PCT Filed: Mar. 12, 2010

(86) PCT No.: PCT/EP2010/053205
§ 371 (c)(1),
(2), (4) Date: Dec. 2, 2011

(87) PCT Pub. No.: WO2010/115677
PCT Pub. Date: Oct. 14, 2010

(65) Prior Publication Data
US 2012/0070528 A1    Mar. 22, 2012

(30) Foreign Application Priority Data
Apr. 6, 2009  (DE) .......................... 10 2009 003 751

(51) Int. Cl.
*B29C 51/04* (2006.01)
*B29C 51/26* (2006.01)

(52) U.S. Cl.
USPC .... 425/397; 425/394; 425/400; 425/DIG. 48; 425/DIG. 53; 264/291; 264/322

(58) Field of Classification Search
USPC ................. 425/383, 394, 397, 400, DIG. 48, 425/DIG. 53; 264/291, 322
See application file for complete search history.

(56) References Cited

U.S. PATENT DOCUMENTS

| | | | |
|---|---|---|---|
| 2,759,217 A * | 8/1956 | Peterson ................ | 425/DIG. 53 |
| 3,315,301 A | 4/1967 | Dibblee et al. | |
| 5,127,866 A * | 7/1992 | Adler et al. ..................... | 269/34 |
| 5,552,006 A | 9/1996 | Soliday et al. | |
| 5,843,492 A * | 12/1998 | McCorry ...................... | 425/397 |
| 6,487,902 B1 * | 12/2002 | Ghosh ............................ | 73/159 |
| 8,141,855 B2 * | 3/2012 | McCracken et al. ............ | 425/66 |

FOREIGN PATENT DOCUMENTS

DE          1778619          8/1971

* cited by examiner

*Primary Examiner* — Richard Crispino
*Assistant Examiner* — Thukhanh Nguyen
(74) *Attorney, Agent, or Firm* — Lawson & Weitzen LLP; Sonia K. Guterman; Teofilo Javier, Jr.

(57) ABSTRACT

The invention relates to a device for stretching film sections in a monoaxial or biaxial manner, preferably by way of a tenter frame, for films made substantially of polymers, wherein a square or rectangular section of a such film is seized at 4 sides by at least two tenter hooks each, designed as regards improved stretching such that the upper tenter hook part (11) is mounted in an articulated fashion on a rotational axis located outside the film to be stretched, and specifically such that the lower, fixed tenter hook part (13) carries the joint, while the upper tenter hook part (11) is designed so as to pivot upwards and at least one cylinder (14) is disposed rotated by 90° for applying the tensioning power and thus applies the tensioning power to the upper pivotable tenter hook part (11).

7 Claims, 4 Drawing Sheets

View A

DEVICE FOR STRETCHING FILM SECTIONS IN A MONOAXIAL OR BIAXIAL MANNER

RELATED APPLICATIONS

This application is a national phase application and claims the benefit of international application serial number PCT/EP2010/053205 filed Mar. 12, 2010 which claims the benefit of German application serial number 10 2009 003 751.9 filed Apr. 6, 2009, both of which are hereby incorporated herein by reference in their entireties.

The invention relates to a device for stretching film sections in a monoaxial or biaxial manner, which are preferably made essentially from polymers, wherein a square or rectangular section of such a film is seized at four sides by at least two tenter hooks each, wherein a fixed lower tenter hook part forms the support and an upper tenter hook part lowered from above normal to the plane of the film clamps the film at the peripheral edge.

The lowering of the upper tenter hook part and the build-up of the tensioning power is brought about, for example, by pneumatic or hydraulic cylinders.

After heating up of the clamped film by, for example, hot air or IR radiation, four groups of tenter hooks move apart on all four sides in order to carry out the stretching process.

The tenter hooks are guided in each case in guide rails, which are moved for example by geared motors or hydraulic cylinders.

Figure 1:
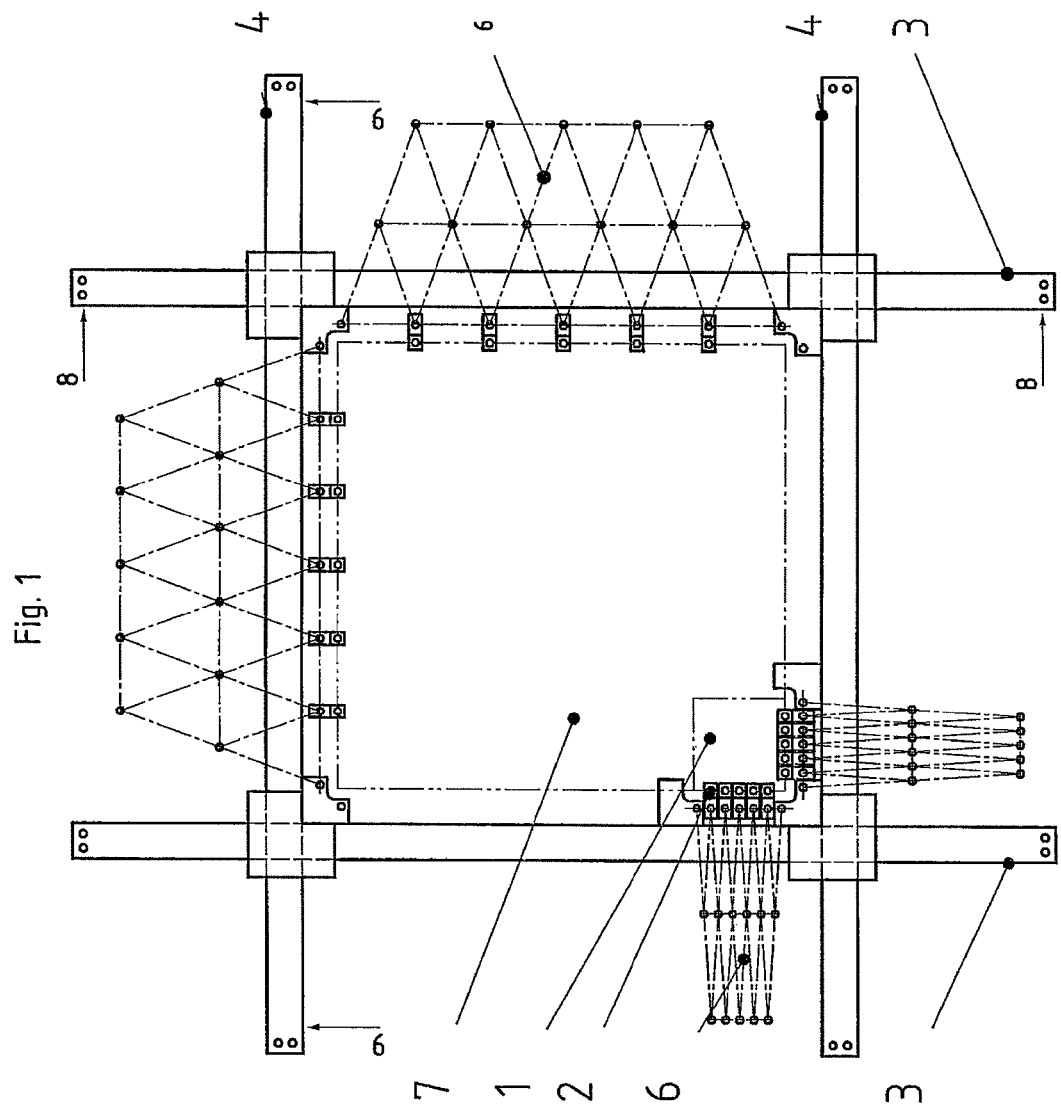

The tenter hooks are synchronised in their movement by means of a pantograph system (a system of crosswise-arranged parallel-running strips which are connected to one another in an articulated manner) in order to ensure a uniform stretching process on all sides (schematic representation FIG. 1).

Known devices of this kind, which are also generally referred to as stretching frames, use five tenter hooks with a width of 10 to 12 mm on each of the four sides in order, for example, to clamp a square film sample in sizes of 100×100 mm (see FIG. 1).

A somewhat small width of the tenter hooks, and therefore a larger number of tenter hooks, is required in order to ensure uniform stretching of the film.

The limited width of the tenter hooks also limits the size of the incorporated pneumatic or hydraulic cylinder for applying the tensioning power. Especially for high temperature applications, the use of air or $N_2$ (nitrogen) is required to operate in the cylinders, the specific pressures being limited here.

The effect of this is that, in the case of larger film thicknesses and resultant higher stretching powers, the tensioning power applied by the pneumatic tensioning cylinder is insufficient and the films may slip out of the tenter hooks.

A further important parameter is the heating of the clamped film to a very precise stretching temperature. For this function, the linking of the vertically arranged upper tenter hooks with the mounted tensioning cylinder is problematic. This is because a vertical wall of the upstanding tenter hooks at a height of 60-80 mm arises around the net area of the clamped film of, for example, 80×80 mm. The heating by the medium hot air nor, for example, by IR radiation has to take place into this narrow shaft. The uniform heating of the film in the edge region and of the tenter hooks holding the film is not guaranteed.

The devices according to the prior art have the following drawbacks:

The tensioning power of the employed tenter hooks is in some cases too low to apply the necessary retention forces, especially in the case of thicker films (1.5 to, for example, 3 mm thickness).

The hitherto vertically arranged tensioning cylinders form a narrow surrounded space in which homogeneous heating, for example by means of hot air or IR radiation, of the film area within the tenter hook region, but also the film around the tenter hooks and the tenter hooks themselves, is difficult.

The problem of the aforementioned invention is to overcome the existing drawbacks.

According to the invention, the problem is solved by the features of claim 1, wherein the upper tenter hook half is mounted according to the invention in an articulated manner on a rotational axis located outside the film to be stretched. And more precisely such that the lower, fixed tenter hook part carries the joint, while the upper tenter hook part is designed so as to pivot upwards and the cylinder is disposed horizontally rotated through 90° for applying the tensioning power and thus applies the tensioning power to the upper, pivotable tenter hook part.

In a preferred embodiment, a plurality of preferably horizontally disposed tensioning cylinders can be disposed axially offset on the respective tenter hook, in such a way that, on the tenter hooks disposed beside one another, the first tensioning cylinder for example is mounted on the first tenter hook with a short flange, the second tensioning cylinder is mounted on the second tenter hook, but axially offset by the length of the tensioning cylinder, the third tensioning cylinder is mounted on the third tenter hook again with a short flange—and so forth. This thus makes it possible for each tensioning cylinder to be selected much larger in the external diameter and for the tensioning power of the tensioning cylinders thus to be significantly increased.

It is thus possible, for example, for each tensioning cylinder now to have, instead of an external diameter of, for example, 12.5 mm equal to the width of the tenter hook as previously, a diameter enlarged for example to 19 mm, so that the lengthened piston rod of the tensioning cylinder axially displaced backwards just fits through between the two short-mounted tensioning cylinders and the tensioning power can be increased by a factor of 2.5 to 3 as a result of the offset embodiment and the enlargement of the diameter of the tensioning cylinder thus made possible.

In an advantageous embodiment of the invention, provision is made such that the upper tenter hook part is designed in two parts, wherein in a further advantageous manner the actual tenter hook is mounted separated and height-adjustable on the pivotable base lever, so that the tenter hook face can be adapted in the optimum manner in the clamping position to different film thicknesses.

A further advantageous embodiment of the invention makes provision such that the upper and lower tenter hook parts are designed in their part seizing the film with a smaller width than the base body of the tenter hook, as a result of which, beside the regions in which the film is seized between the tenter hook parts, a free space up to the next tenter hook arises, which also allows the film edges and the tips of the tenter hooks to be heated by the heating medium—whether it be hot air or IR radiation heat or suchlike—just as intensively as the inner region of the film A further advantageous embodiment of the invention makes provision such that the pivotable tenter hook part and the counter-tenter hook part have a minimum length in order to create a free space around the actual film sample, which permits the film edges and the tenter hooks themselves to be heated by the heating medium just as intensively as the inner region of the film, as a result of which uniform heating also of the film edges and the tenter hooks in the clamping region is enabled.

A further advantageous embodiment of the invention makes provision such that the tensioning cylinders are acted upon optionally by gaseous or liquid media or that electric drives for the adjustment and power application are also used.

Such a device constructed according to the measures of the invention has the following advantages:

the available tensioning power for clamping the film is increased by a factor of 2.5 to 3 (with the same pressure of the medium, such as for example air or nitrogen at 40 bar pressure), as a result of which much higher stretching forces can be applied so that thicker films of approx. 2 to 3 mm can also be reliably stretched.

and a free space becoming much larger in the peripheral direction around the film to be stretched, due to the tenter hooks lengthened in the film direction, enables a better and more precise heating of the film in the central region, but also particularly up to the edge, and also of the tenter hooks.

the tenter hooks reduced in width permit optimum adaptation of the ratio of the tenter hook width to the free film between the tenter hooks in order to enable uniform heating, but also tear-free stretching of the edge regions.

The advantages and features of the invention also emerge from the following description of an example of embodiment in combination with the drawings and the claims. In the figures:

FIG. 1 shows a plan view of a stretching frame for the stretching of film sections in a monoaxial or biaxial manner according to the prior art;

FIG. 2 shows a cross-sectional representation through the stretching group according to FIG. 1;

FIG. 3 shows a cross-sectional representation through a tensioning tenter hook according to the aforementioned invention;

FIG. 4 shows a plan view of the stretching frame according to the aforementioned invention in the clamping position with unstretched film with tensioning cylinders, which are axially offset with respect to one another in two rows; and

FIG. 5 shows a side view of the tensioning cylinder for the tensioning tenter hooks.

FIG. 1 shows a plan view of a stretching frame for stretching film sections in a monoaxial or biaxial manner according to the prior art. The section at bottom left shows the initial situation in which an unstretched, square film section 1 is seized by five tenter hooks on each side and is clamped at the edges. Tenter hooks 2 are in each case guided in guide rails 3 and 4.

Pantograph system 6 synchronises the movement of the individual tenter hooks in order to ensure a uniform stretching process at all four sides of the film. The side at top right shows the stretching frame in a state driven apart after the stretching with stretched film 7. A corresponding stretching frame can also be used to implement the device according to the invention.

The drive for the stretching process is produced by one (or two separate, synchronously running) geared motor(s) or hydraulic cylinder(s), which moves the right-hand guide rail to the right, upper rail 4 also being moved upwards.

Figure 2:
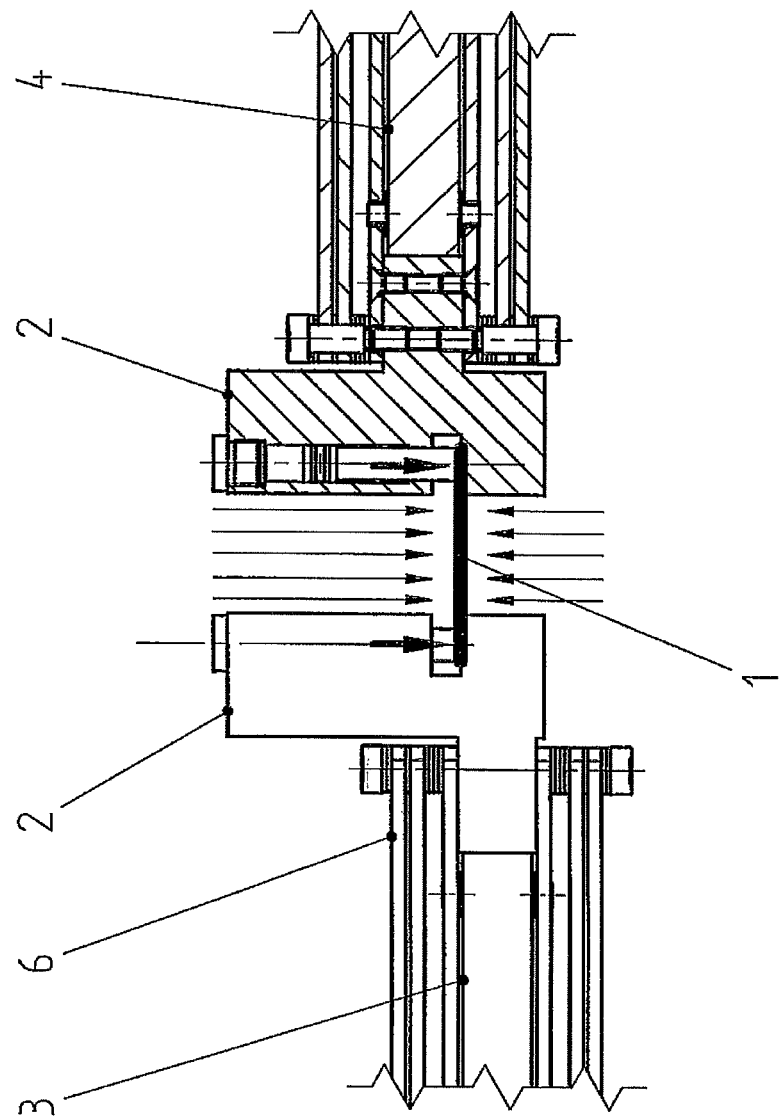

FIG. 2 shows a cross-sectional representation through the stretching group according to FIG. 1. Primary film 1 is clamped by means of tenter hooks 2 with an incorporated tensioning cylinder. Tenter hooks 2 are guided in guide rails 3 and the movement of the individual tenter hooks is synchronised by pantograph system 6.

The heating of the film takes place by hot air 11 from above and below or, for example, by IR radiation.

The installation situation shows that the uniform heating of the clamped film is difficult in the central free region, but in the region in the tenter hooks is very difficult.

The film to be clamped is pushed in below in a slot in the tenter hook holding fixture. The edge region is thus completely covered from above and below.

Figure 3:
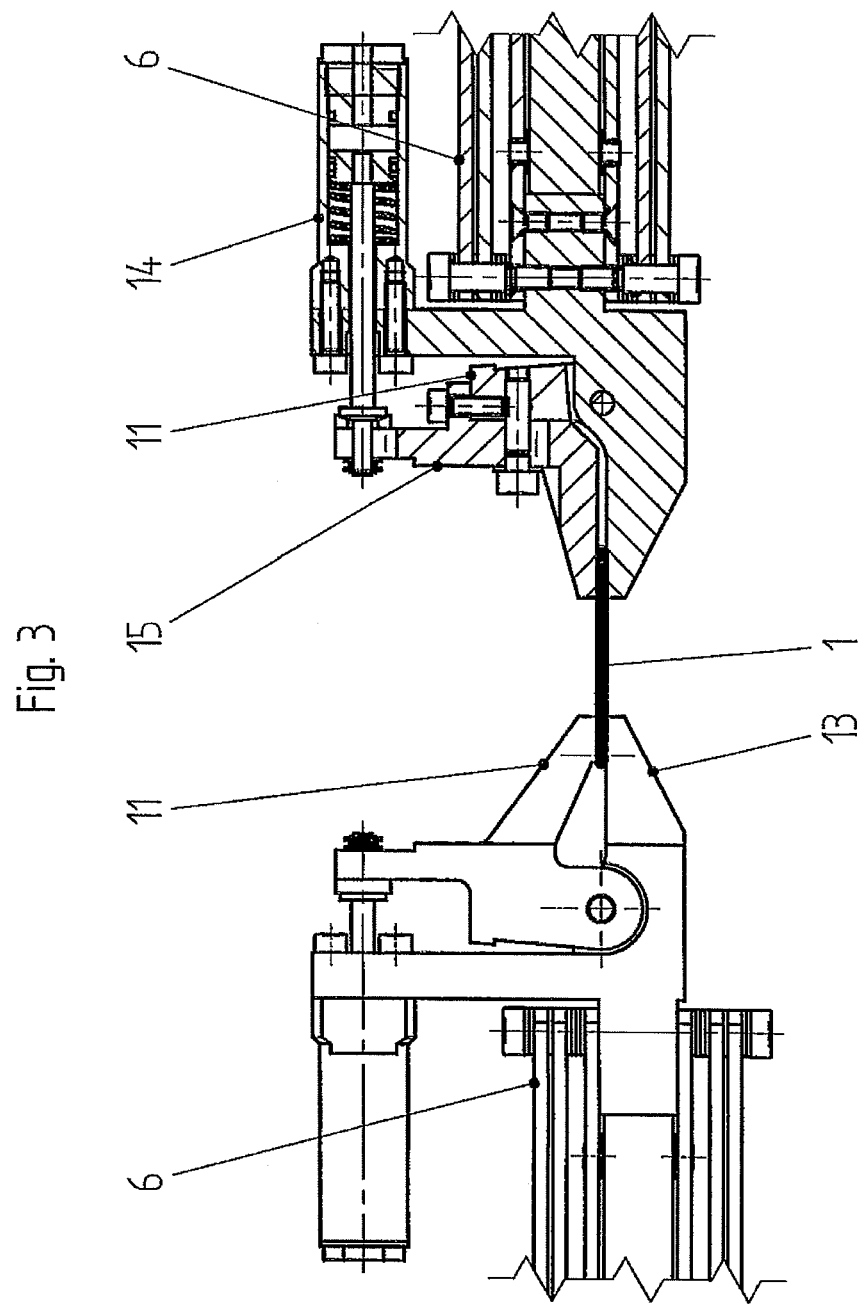

FIG. 3 shows a cross-section through two tensioning tenter hooks according to the aforementioned invention.

Upper tenter hook part 11 is mounted in an articulated manner on a rotational axis 12 located outside the film to be stretched, but approximately in the plane of the film, wherein lower, fixed tenter hook part 13 carries the joint. Cylinder 14 for applying the tensioning power is fixed horizontally, rotated through 90°, to a vertical web of the lower fixed tenter part and thus applies the tensioning power to the upper pivotable tenter hook part.

It can clearly be seen that the tenter hook parts and the clamped raw film with a width, for example, of 110 mm are freely exposed to the hot air or the IR radiation in order to enable optimum heating.

The drawing shows a partition of pivotable upper tenter hook part 11, such that front upper tenter hook part 15 is mounted separated and height-adjustable on the base lever so that the tenter hook face can be adapted in the optimum manner to different film thicknesses.

Figure 4:
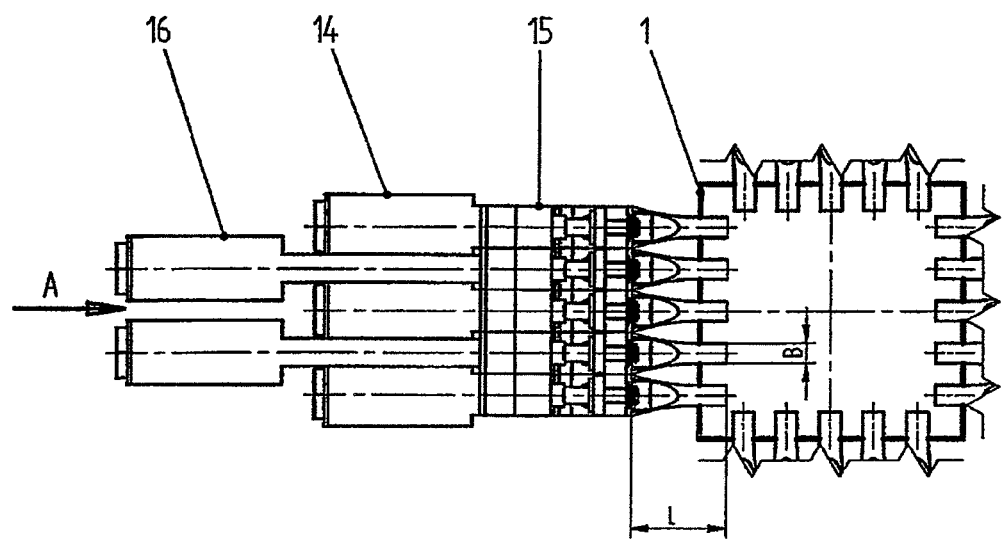
Figure 5:
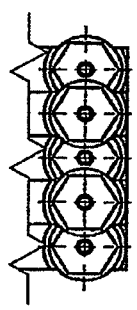

FIG. 4 shows a plan view of a stretching group according to the aforementioned invention in the clamping position of the unstretched film with tensioning cylinders which are axially offset in two rows.

In the case of a plurality of tenter hooks disposed in parallel (e.g. 5 thereof in the example represented), when tensioning cylinders are disposed directly in parallel the latter could only have at most the same width as the tenter hooks themselves, e.g. 12.5 mm.

The present invention is characterised in that the plurality of tensioning cylinders disposed horizontally beside one another are disposed axially offset on the respective tenter hook, in such a way that, for example, tensioning cylinders 14 with a short flange are fixed respectively on the odd tenter hooks in rows 1, 3 and 5, but tensioning cylinders 16 with a long flange are fixed on tenter hooks 2 and 4 lying in between, in each case mounted so as to be axially offset by the length of a tensioning cylinder. It is thus possible for each tensioning cylinder to be selected much larger in the external diameter and for the tensioning power of the tensioning cylinders thus to be significantly increased. Furthermore, it is thus possible for the respective tensioning cylinder now to have, instead of the external diameter of for example 12 mm (equal to the width of the tenter hook), a diameter of for example 19 mm, so that the lengthened piston rod of the tensioning cylinder axially displaced backwards just fits through between the two short-mounted tensioning cylinders. The tensioning power can be increased by a factor of 2.5 to 3 as a result of this offset embodiment and of the enlargement of the diameter of the tensioning cylinder thus made possible.

FIG. 4 also shows that mobile tenter hook part 15 and fixed tenter hook part 13 lying thereunder are constituted slimmer at the part seizing the film than the overall width of the tenter hook, as a result of which there also arises beside the region in which the film is seized between the tenter hooks a free space up to the next tenter hook, which permits the film in the edge region to be heated just as intensively as in the inner region.

View "A" in FIG. 4 shows the view of the tensioning cylinders from the side of the supply of, for example, compressed air.

The invention claimed is:

1. A device for stretching film sections in a monoaxial or biaxial manner preferably by means of a stretching frame, for films (7) which are preferably made essentially from polymers, wherein a square or rectangular section of such a film is seized at four sides by at least two tenter hooks (15) each, characterised in that an upper tenter hook part (11) is mounted in an articulated manner on a rotational axis located outside the film to be stretched, and more precisely such that a lower, fixed tenter hook part (13) carries a joint, while an upper tenter hook part (11) is designed so as to pivot upwards, and at least one cylinder (14, 16) is disposed horizontally on a vertical web rotated through 90° for applying tensioning power and thus applies the tensioning power to the upper, pivotable tenter hook part (11), and that a plurality of tensioning cylinders (14, 16) disposed horizontally beside one another are disposed axially offset on the respective tenter hook, for example in such a way that a first tensioning cylinder (14) for example is mounted on the first tenter hook with a short flange, a second tensioning cylinder (16) is mounted on the second tenter hook axially offset by the length of the first tensioning cylinder (14), a third tensioning cylinder is mounted on a third tenter hook with a short flange, and so forth.

2. The device according to claim 1, characterised in that the upper tenter hook part (11) is designed in two parts, wherein the respective tenter hook (15) is mounted separately height-adjustable on a pivotable base lever (11), so that a tensioning face of the tenter hook (15) is adjustable in height and can be adapted to different film thicknesses.

3. The device according to claim 1, characterised in that the upper and lower tenter hook parts (11, 13) are designed in their part seizing the film (7) with a smaller width than an overall body of the tenter hook, as a result of which, beside regions of the tenter hook (15) in which the film (7) is seized between the tenter hook parts (11, 13), a free space up to the next tenter hook arises.

4. The device according to claim 1, characterised in that a part of the tenter hooks (15) constituted with a smaller width is much longer than a width of the film (7) to be stretched, so that an outer edge of the film (7) can be heated.

5. The device according to claim 2 characterised in that the upper and lower tenter hook parts (11, 13) are designed in their part seizing the film (7) with the smaller width than the overall body of the tenter hook, as a result of which, beside the regions of the tenter hook (15) in which the film (7) is seized between the tenter hook parts (11, 13), the free space up to the next tenter hook arises.

6. The device according to claim 2, characterised in that the part of the tenter hooks (15) constituted with the a smaller width is much longer than the width of the film (7) to be stretched, so that the outer edge of the film (7) can be heated.

7. The device according to claim 3, characterised in that the part of the tenter hooks (15) constituted with the smaller width is much longer than the width of the film (7) to be stretched, so that the outer edge of the film (7) can be heated.

* * * * *